July 7, 1925.  
W. H. MUNROE  
ADJUSTABLE SEAT FOR VEHICLES  
Filed Aug. 20, 1923
1,545,269
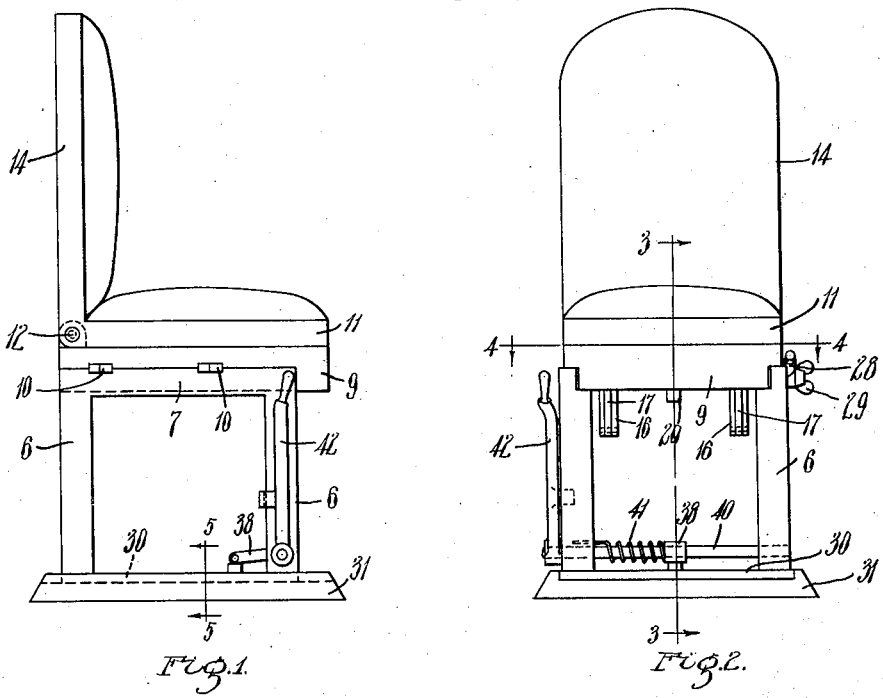
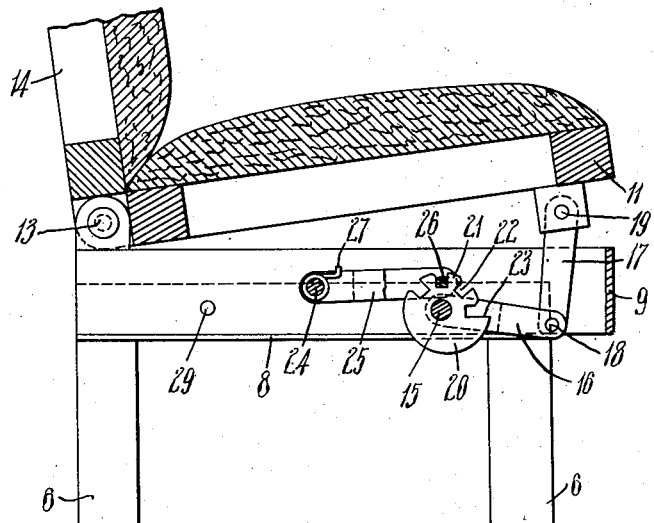
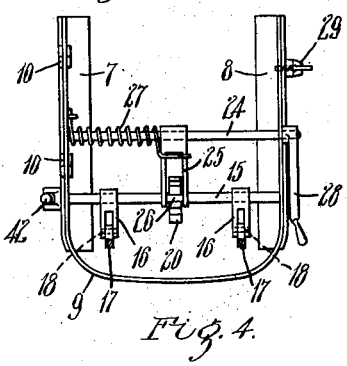
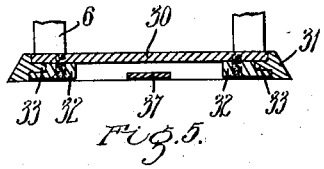
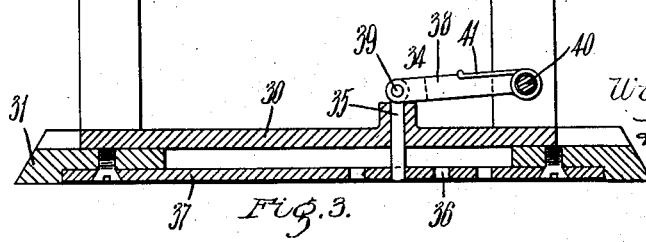
Inventor:  
William H. Munroe.

Patented July 7, 1925.

1,545,269

UNITED STATES PATENT OFFICE.

WILLIAM H. MUNROE, OF MALDEN, MASSACHUSETTS.

ADJUSTABLE SEAT FOR VEHICLES.

Application filed August 20, 1923. Serial No. 658,201.

*To all whom it may concern:*

Be it known that I, WILLIAM H. MUNROE, a citizen of the United States, residing at Malden, in the county of Middlesex and State of Massachusetts, have invented new and and useful Improvements in Adjustable Seats for Vehicles, of which the following is a specification.

This invention relates to an adjustable seat for vehicles and has for its object to provide a seat of the character mentioned so constructed that the operator of a motor vehicle may vary the distance between the seat of said vehicle and the foot pedals thereof, said distance being varied either by moving said seat in its entirety either forwardly or rearwardly, or by tipping the seat bottom to raise or lower the front portion thereof in order that he may obtain the proper amount of leg room required to comfortably and easily operate the vehicle.

Another object of the invention is to provide a novel mechanism for holding the seat bottom in its various tipped positions.

The invention consists in the combination and arrangement of parts set forth in the following specification and particularly pointed out in the claims thereof.

Referring to the drawings:

Figure 1 represents a side elevation of a seat embodying my invention.

Fig. 2 is a front elevation of said seat.

Fig. 3 is an enlarged vertical section through the seat as taken on the line 3—3 of Fig. 2.

Fig. 4 is a horizontal section as taken on the line 4—4 of Fig. 2.

Fig. 5 is a detail transverse section as taken on the line 5—5 of Fig. 1.

Like numerals refer to like parts throughout the several views of the drawings.

In the drawings, 6 represents a main supporting frame at the top of which two oppositely disposed angle portions 7 and 8 are provided. An auxiliary frame 9 is pivotally mounted to swing laterally of the seat being attached at one side thereof to the angle portion 7 by hinges 10 while the opposite side of said auxiliary frame rests upon the angle portion 8. A seat bottom 11 which may be of any suitable construction is pivoted at 12 and 13 to the auxiliary frame 9. A back rest 14 is formed integral with and projects upwardly from the seat bottom 11 and said seat bottom and back rest may, therefore, move in unison upon the pivots 12 and 13, thereby raising or lowering the front portion of the seat bottom 11, and moving the upper portion of the back rest 14 either rearwardly or forwardly.

The combined seat bottom and back rest may be locked in any of its various tipped positions by mechanism as follows: Mounted in the auxiliary frame 9 is a shaft 15 to which a pair of arms 16 are rigidly fastened. Each arm 16 is operatively connected with the seat bottom 11 through the medium of links 17, the opposite ends of which are connected at 18 and 19 with the arms 16 and seat bottom 11 respectively. Rigidly fastened to the shaft 15 is a member 20 which is provided with a plurality of suitable teeth 21 between which are spaces 22 having parallel sides. The member 20 also embodies therein a projecting edge 23 which constitutes a stop to limit the upward movement of the front portion of the seat bottom 11. Another shaft 24 is also mounted in the auxiliary frame 9 and rigidly fast to said shaft is a bifurcated locking arm 25 in which a pin 26 is mounted, said pin being adapted to enter the spaces 22 of the toothed member 20. The arm 25 is raised against the tension of a spring 27 to disengage the pin 26 from the toothed member 20 through the medium of an operating handle 28 and when the front portion of the seat bottom 11 is raised, as illustrated in Fig. 3, the toothed member 20 is rotated until it assumes a position where the arm 25 may swing downwardly, carrying the pin 26 into another of the spaces 22 of said toothed member, thereby locking the seat bottom in its tipped position.

The auxiliary frame 9 is normally held locked to the main supporting frame 6 through the medium of a suitable fastening device preferably a thumb screw 29.

Rigidly fastened to the bottom of the main supporting frame 6 is a plate 30 which is mounted upon a base 31 to which it is held by a pair of blocks 32, said plate and blocks being adapted to slide upon ways 33 provided upon said base. The main supporting frame 6 is locked to the base 31 in any of the various positions it may assume upon the latter through the medium of a locking device 34 which embodies therein a pin 35 mounted in the plate 30 and adapted to project into any one of a plurality of holes 36 provided in a plate 37 fast to the base 31. The pin 35 is raised and lowered through the medium of an arm 38 to which it is connected at 39 and said arm is rigidly fastened to a shaft 40 mounted to rock in suitable bearings provided in the main supporting frame 6. A spring 41 surrounds the shaft 40 and normally acts to hold the pin 35 in its lowered position. The shaft 40 is rocked through the medium of an operating handle 42 which is fast thereto.

The general operation of the device is as follows: Assuming that the seat bottom 11 and back rest 14 thereof are located in their normal positions as illustrated in Fig. 1 and it is desired to lift the forward end of said seat bottom, the operating handle 28 is grasped and raised, thereby rocking the shaft 24 and arm 25 fast thereto and lifting the pin 26 out of one of the spaces 22 of the toothed member 20. The forward end of the seat bottom 11 is then grasped and raised, thereby rotating the toothed member 20 until the required space 22 of said toothed member aligns with the pin 26, when the handle 28 is released, allowing said pin 26 to drop into said space and thereby locking the seat bottom in its tipped position. If, on the other hand, the operator of the vehicle wishes to move the entire seat either forwardly or rearwardly he may do so by grasping the operating handle 42 and moving the same to raise the pin 35 from engagement with the plate 37 and said seat may then be moved manually as desired until the pin 35 aligns with another hole 36 in which it is allowed to spring. It will, therefore, be seen that by adjusting the seat in its entirety either forwardly or rearwardly, or the front portion of the seat bottom either upwardly or downwardly, that a wide range of adjustments are possible and the proper distance between the upper surface of the seat bottom and the foot pedals of a vehicle is easily obtained.

If, for any reason, it is necessary to gain access to the mechanism which is mounted upon the auxiliary frame 9 and which is located just beneath the seat bottom 11, the same may be easily accomplished by disengaging the thumb screw 29 from said auxiliary frame 9 and then tipping the latter laterally of the seat with the seat bottom and back rest attached thereto until they are all located in an inverted position.

I claim:

1. A seat comprising, in combination, a main supporting frame, an auxiliary frame pivotally mounted upon said main frame, and adapted to be tipped laterally of said seat, a combined seat bottom and back rest pivotally mounted upon said auxiliary frame and adapted to be tipped rearwardly relatively to said seat, a toothed member mounted to rotate upon said auxiliary frame and operatively connected to said seat bottom and an arm adapted to interlock with said toothed member and thereby hold said seat bottom and back rest in a tipped position.

2. A seat comprising, in combination, a main supporting frame, an auxiliary frame pivotally mounted upon said main frame, and adapted to be tipped laterally of said seat, a seat bottom pivotally mounted upon said auxiliary frame and adapted to be tipped rearwardly relatively to said seat, a toothed member mounted upon said auxiliary frame and operatively connected to said seat bottom and a spring actuated arm pivotally mounted upon said auxiliary frame and adapted to interlock with said toothed member and thereby hold said seat bottom in an inclined position.

3. A seat comprising, in combination, a main supporting frame, an auxiliary frame pivotally mounted upon said main frame, and adapted to be tipped laterally of said seat, a combined seat bottom and back rest pivotally mounted upon said auxiliary frame and adapted to be tipped rearwardly relatively to said seat, a shaft mounted upon said auxiliary frame, a member fast to said shaft and provided with a plurality of teeth thereon, an arm fast to said shaft, a link operatively connecting said arm and said seat bottom, a locking arm pivotally mounted upon said auxiliary frame and adapted to spring into engagement with said toothed member and thereby hold said seat bottom and back rest in a tipped position and an operating handle for said last-named arm.

4. A seat comprising, in combination, a base, a main supporting frame slidably mounted upon said base, a pin slidably mounted upon said main supporting frame and interlocking with said base, means to disengage said pin from said base, an auxiliary frame pivotally mounted upon said main supporting frame, means to lock said auxiliary frame to said main supporting frame, a combined seat bottom and back rest pivotally mounted upon said auxiliary frame and adapted to be tipped rearwardly relatively to said seat, a shaft mounted upon said auxiliary frame, a member fast to said shaft and provided with a plurality of teeth thereon, an arm fast to said shaft, a link operatively connecting said arm and said seat bottom, a locking arm pivotally mounted upon said auxiliary frame and adapted to spring into engagement with said toothed member and thereby hold said seat bottom and back rest in a tipped position and an operating handle for said last-named arm.

In testimony whereof I have hereunto set my hand in presence of two subscribing witnesses.

WILLIAM H. MUNROE.

Witnesses:
FRANKLIN E. LOW,
HAZEL F. BATES.